United States Patent
Song

(10) Patent No.: US 8,463,352 B2
(45) Date of Patent: Jun. 11, 2013

(54) STEERING WHEEL WITH BIOMETRIC SENSOR

(75) Inventor: Kidong Song, Gunpo-si (KR)

(73) Assignee: Hyundai Motor Company, Seoul (KR)

( * ) Notice: Subject to any disclaimer, the term of this patent is extended or adjusted under 35 U.S.C. 154(b) by 329 days.

(21) Appl. No.: 12/876,579

(22) Filed: Sep. 7, 2010

(65) Prior Publication Data

US 2011/0132136 A1 Jun. 9, 2011

(30) Foreign Application Priority Data

Dec. 3, 2009 (KR) .................. 10-2009-0119044

(51) Int. Cl.
*A61B 5/04* (2006.01)
*A61B 5/0492* (2006.01)

(52) U.S. Cl.
USPC .............. 600/372; 600/393; 74/552; 340/576

(58) Field of Classification Search
USPC ............... 600/372, 393; 74/552; 340/576
See application file for complete search history.

(56) References Cited

U.S. PATENT DOCUMENTS

| | | | | |
|---|---|---|---|---|
| 4,572,207 A | * | 2/1986 | Yoshimi et al. | 600/519 |
| 5,313,942 A | * | 5/1994 | Platzker | 600/384 |
| 5,453,929 A | * | 9/1995 | Stove | 701/1 |
| 6,104,296 A | * | 8/2000 | Yasushi et al. | 340/576 |
| 6,239,707 B1 | | 5/2001 | Park | |
| 8,171,820 B2 | * | 5/2012 | Song | 74/552 |
| 2005/0239075 A1 | * | 10/2005 | Yanagidaira et al. | 435/6 |
| 2006/0025698 A1 | * | 2/2006 | Nakagawa et al. | 600/513 |
| 2008/0228046 A1 | | 9/2008 | Futatsuyama et al. | |
| 2008/0238695 A1 | | 10/2008 | Yanai et al. | |
| 2009/0156915 A1 | | 6/2009 | Cross | |
| 2010/0137702 A1 | * | 6/2010 | Park et al. | 600/393 |
| 2012/0006147 A1 | * | 1/2012 | Sano | 74/552 |

FOREIGN PATENT DOCUMENTS

| | | | |
|---|---|---|---|
| DE | 19545848 | * | 8/1997 |
| JP | 2001-238858 A | | 9/2001 |
| JP | 2006-26211 A | | 2/2006 |
| JP | 2008-237378 A | | 10/2008 |
| JP | 2008-301959 A | | 12/2008 |
| KR | 10-2005-0024566 A | | 3/2005 |
| KR | 10-2007-0093201 A | | 9/2007 |

* cited by examiner

*Primary Examiner* — Lee S Cohen
(74) *Attorney, Agent, or Firm* — Morgan, Lewis & Bockius LLP

(57) ABSTRACT

A steering wheel with a biometric sensor apparatus may include a plurality of sensing prominences having electric conductivity and protruding from an outer surface of the steering wheel.

2 Claims, 11 Drawing Sheets

STEERING WHEEL WITH BIOMETRIC SENSOR

CROSS-REFERENCE TO RELATED APPLICATIONS

The present application claims priority to Korean Patent Application Number 10-2009-0119044 filed Dec. 3, 2009, the entire contents of which application is incorporated herein for all purposes by this reference.

BACKGROUND OF THE INVENTION

1. Field of the Invention

The present invention relates to a steering wheel of a vehicle, in more detail, a structure of a steering wheel equipped with a biometric sensor that can measure bio-signals of a driver.

2. Description of Related Art

In general, vehicles are equipped with a steering wheel for a driver to apply operation force for steering the vehicles and, generally, the driver continuously operates the steering wheel with hands while driving the vehicles. Therefore, it is possible to provide a user with new functions that is difficult to achieve in the related art, by acquiring and using bio-signals from the driver's hands through the steering wheel.

That is, it is possible to provide services, such as the current health information of the driver by acquiring bio-signals from the driver's hands through the steering wheel and analyzing the bio-signals.

Further, other than the above services, a variety of services may be possible with development of the technology analyzing the bio-signals acquired, as described above. For example, it is possible to identify fingerprints and veins and use them for anti-thief for vehicles.

The basic and necessary factor in the services described above is to stably acquire bio-signals from the drivers without causing the drivers inconvenience.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a steering wheel equipped with a biometric sensor that stably detects and ensures bio-signals of a driver operating the steering wheel in the same way as the related art, without causing the driver inconvenience.

In an aspect of the present invention, the steering wheel with a biometric sensor apparatus may include a plurality of sensing prominences having electric conductivity and protruding from an outer surface of the steering wheel.

The steering wheel with the biometric sensor apparatus may further include an outer cover formed in a sheet and covering an outer surface of a wheel body of the steering wheel, a stud forming the sensing prominences, wherein a lower portion of the stud is inserted into the wheel body from the outside through the outer cover, and a washer that is connected with the lower portion of the stud inserted in the outer cover.

The stud may have a head positioned outside the outer cover and the lower portion inserted through the outer cover and the outer cover is disposed between the head and the washer, and wherein a protruding end is formed toward the outer cover along a lower edge of the head.

An electric conductive plate may be electrically connected with the stud is interposed between the washer and the outer cover.

In another aspect of the present invention, the steering wheel with the biometric sensor apparatus may further include an outer cover formed in a sheet and covering an outer surface of a wheel body of the steering wheel, and sensing plates having a plurality of integral prominences, which form the sensing prominences, protruding outside through the outer cover, wherein the sensing plates are integrally injection-molded and disposed on the wheel body.

The sensing plates may include a locking portion snap-fitted in a seating groove formed in the wheel body.

The sensing plates may be integrally injection-molded and snap-fitted in seating grooves formed in the wheel body, wherein the sensing plates are bonded to the seating grooves formed in the wheel body.

In further another aspect of the present invention, the steering wheel with the biometric sensor apparatus may further an outer cover formed in a sheet and covering an outer surface of a wheel body of the steering wheel, at lease a body assembly that is coupled to the wheel body of the steering wheel through the outer cover to form a portion of the outer surface of the steering wheel, a plurality of metal prominences that protrude from outer surface of the at least a body assembly to form the sensing prominences, and a plurality of electric plates that electrically connect at least two or more of the metal prominences in the respective body assembly.

The at least a body assembly may be disposed in a seating groove of the wheel body and a locking portion of the at least a body assembly is snap-fitted to the wheel body, wherein an edge portion of the outer cover is disposed between the seating groove and the at least a body assembly and coupled therebetween to form the outer surface of the steering wheel together with the outer cover.

In another aspect of the present invention, the steering wheel with the biometric sensor apparatus may include an outer cover formed in a sheet and covering an outer surface of a wheel body of the steering wheel, and at least a sensing band body protruding in a band shape from the outer surface of the steering wheel to form the sensing prominences, wherein the at least a sensing band body is embedded into a seating groove of the wheel body, and wherein the at least a sensing band body is made of injection-molded plastic and outer surface of the at least a sensing band body, which is exposed to the outside, is plated with electric conductive metal.

The at least a sensing band may have a locking portion that is snap-fitted in the wheel body through the outer cover, and an electric plate may be disposed between the at least a sensing band bodies and the outer cover disposed in the seating groove recessed inside the wheel body, wherein the electric plate is electrically connected to the outer surface of the at least a sensing band body, which is exposed to the outside The present invention makes it possible to stably detect and ensure bio-signals of a driver operating the steering wheel in the same way as the related art, without causing the driver inconvenience, with simple structure and configuration.

The methods and apparatuses of the present invention have other features and advantages which will be apparent from or are set forth in more detail in the accompanying drawings, which are incorporated herein, and the following Detailed

Figure 1:
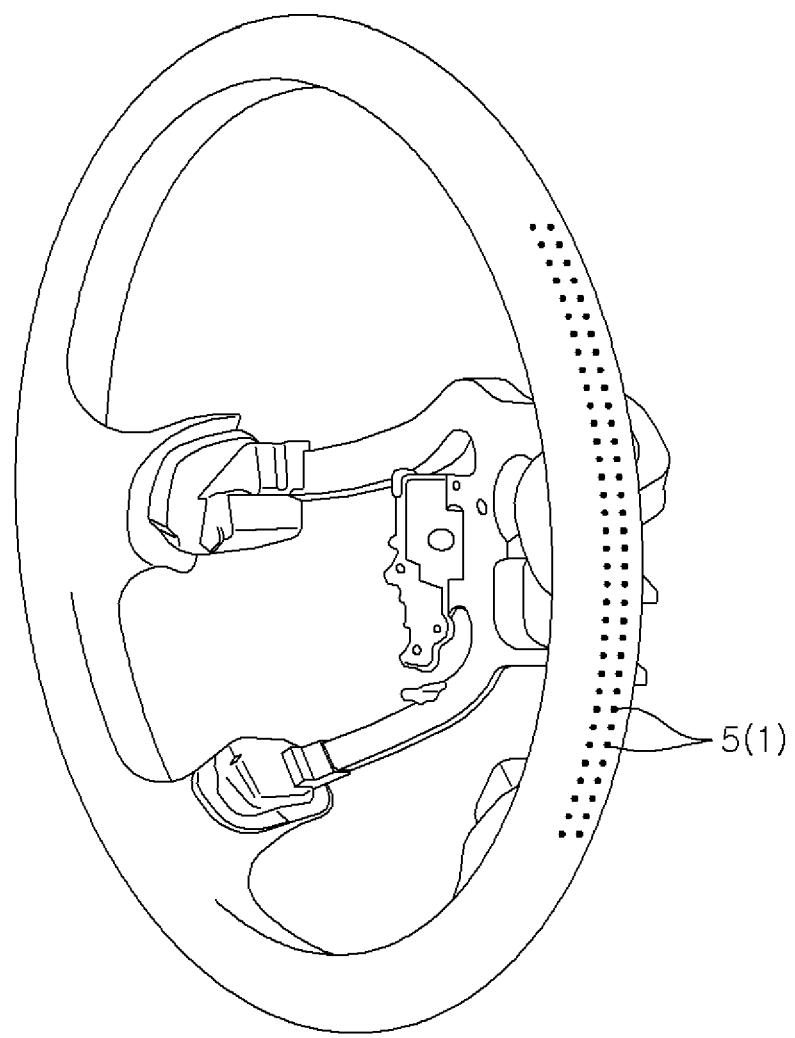
FIG. 1 is a view showing a first embodiment according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Referring to FIGS. 1 to 11, embodiments of the present invention all has a plurality of sensing prominences 1 having electric conductivity and protruding from the surface of a steering wheel.

Figure 2:
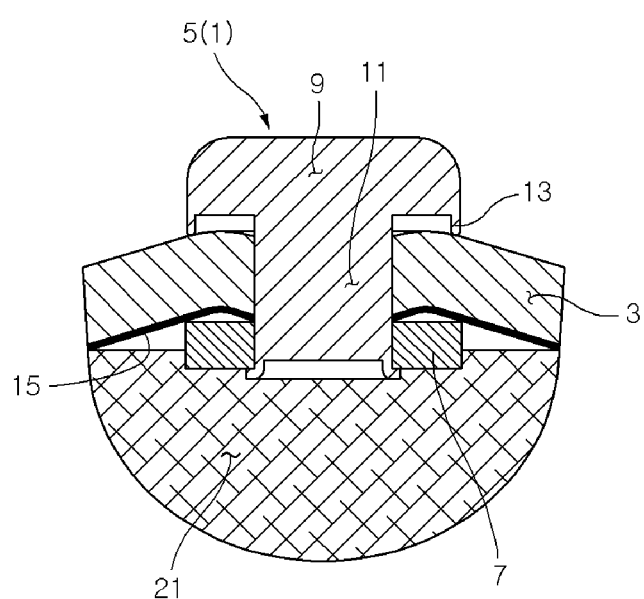
FIG. 2 is a cross-sectional view of the portion around a stud of FIG. 1.
Figure 3:
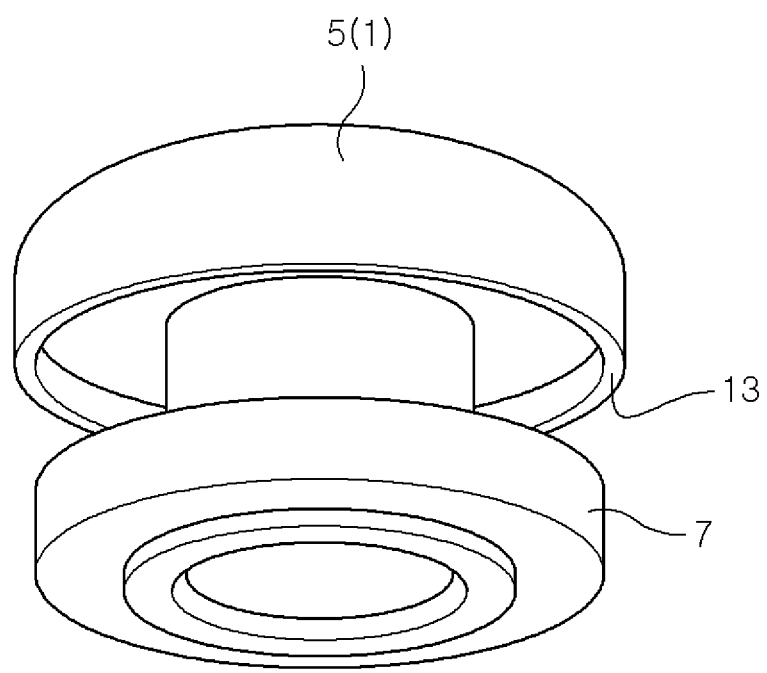
FIG. 3 is a three-dimensional enlarged view of the stud of FIG. 1.

The first embodiment shown in FIGS. 1 to 3 includes an outer cover 3 formed in a sheet shape covering the outermost surface of a steering wheel, a stud 5 that is inserted into outer cover 3 from the outside to form sensing prominences 1, and a washer 7 that is connected with the portion of stud 5 inserted in outer cover 3.

That is, stud 5 is fitted in washer 7 after inserted through outer cover 3 and pressed, such that it is fixed to outer cover 3 in a similar way to riveting of the related art.

In this configuration, outer cover 3 may be made of leather or materials similar to the leather which is generally used for the outer finishing material of steering wheels which covers a wheel body 21.

Stud 5 has a head 9 positioned outside outer cover 3 and an inserting portion 11 inserted through outer cover 3, protruding down from the center of head 9, and a protruding end 13 is formed in the protrusion direction of inserting portion 11 along the edge of head 9.

Accordingly, when stud 5 fitted in washer 7 is forcibly inserted, protruding end 13 embedded in outer cover 3 while pressing it, such that outer cover 3 and stud 5 can be assembled in one unit.

An electric conductive plate 15 electrically connected with stud 5 is interposed between washer 7 and outer cover 3 to function as a path for electrically transmitting bio-signals from stud 5.

A specific electric wire is connected to electric conductive plate 15, such that bio-signals can be transmitted to a controller, etc. which process the bio-signals.

Similarly, the embodiments shown in FIGS. 4 to 7 include an outer cover 3 formed in a sheet covering the outermost surface of a steering wheel, and sensing plates 19 having a plurality of integral prominences 17, which form sensing prominences 1, protruding outside through outer cover 3. The lower portion of the prominences 17 includes a locking portion 24.

Figure 4:
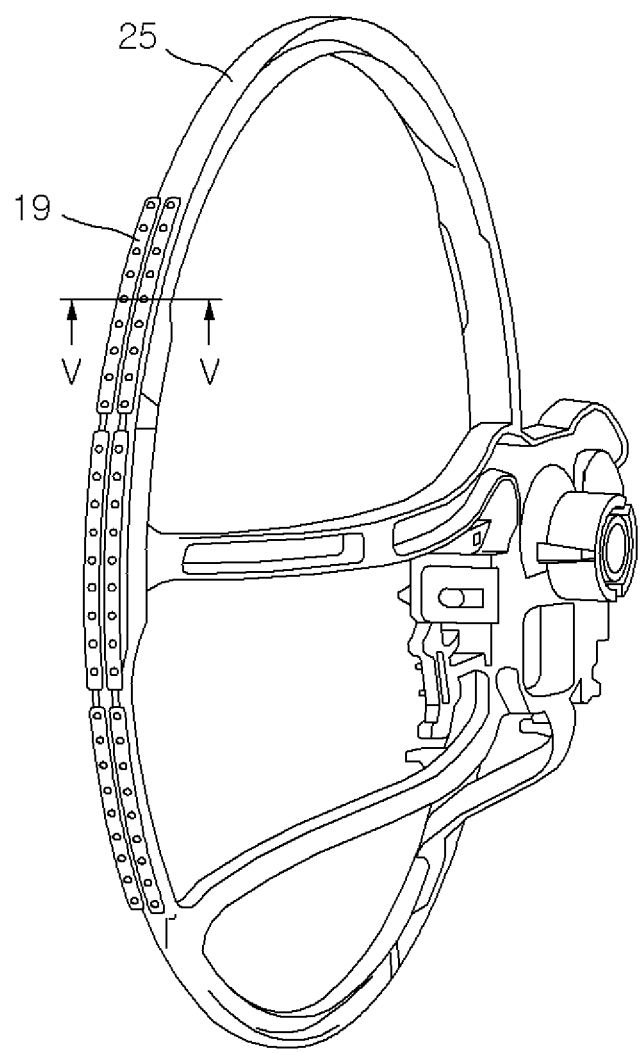
FIG. 4 and 5 are views showing a second embodiment according to the present invention.
Figure 5:
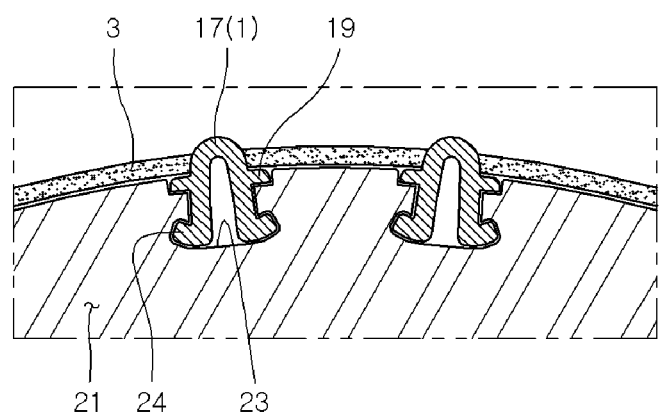

In the second embodiment shown in FIGS. 4 and 5, the common configuration is basically provided, and the locking portion 24 of the prominences 17 is snap-fitted in seating grooves 23 formed in a wheel body 21.

In this configuration, wheel body 21 is the portion that is made of polyurethane, etc. which is integrally injection-molded to cover the outer side of a hub core 25 functioning as the frame of the steering wheel, substantially in a steering wheel shape, and covered by outer cover 3.

Figure 6:
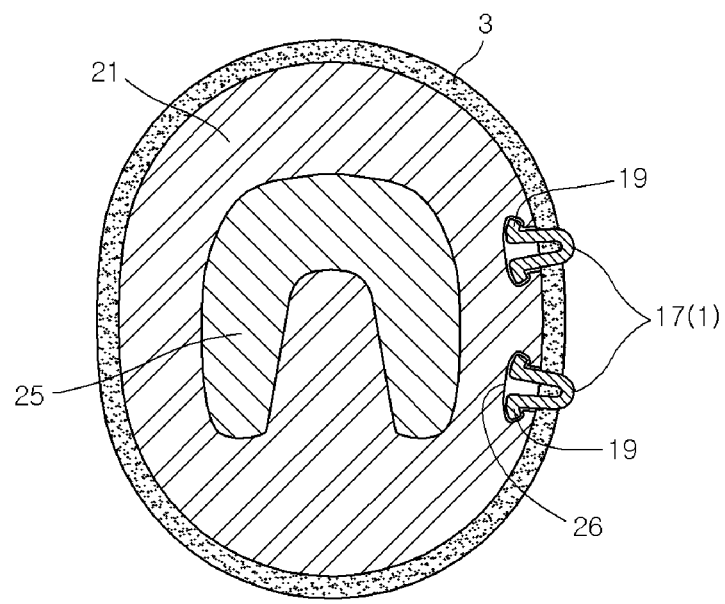
FIG. 6 is a view showing a third embodiment according to the present invention.

In the third embodiment shown in FIG. 6, substantially similar to the second embodiment, sensing plate 19 are inserted, integrally injection-molded, and fixed in a seating groove 26 of a wheel body 21.

Accordingly, it is a structure having the largest combining force between sensing plates 19 and wheel body 21, thereby providing high durability.

Figure 7:
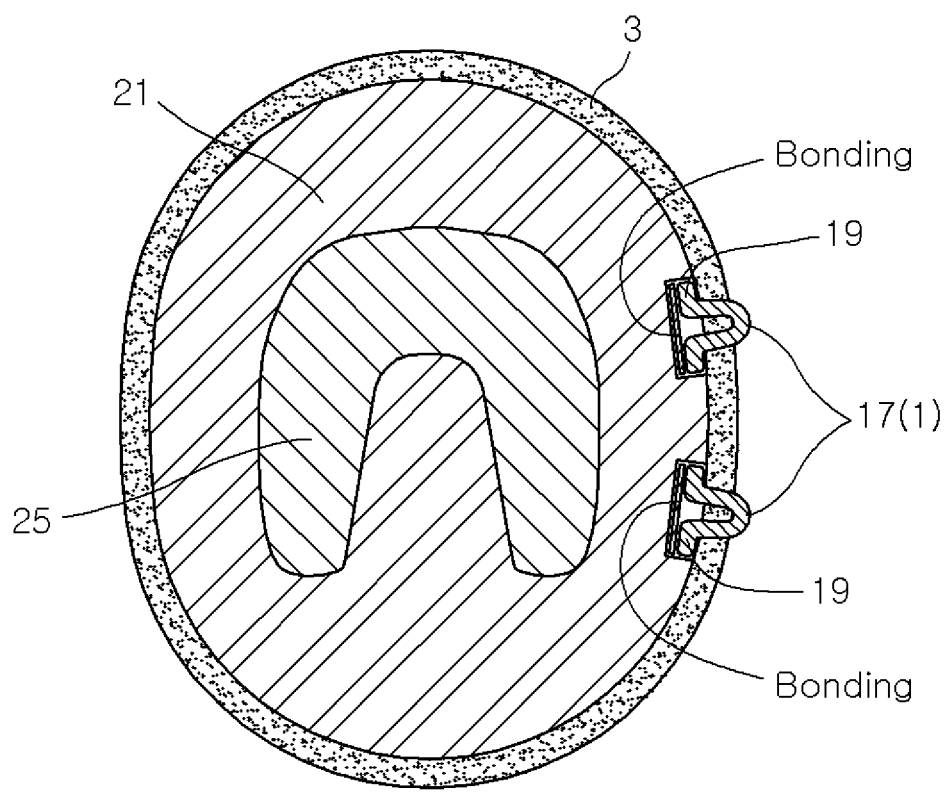
FIG. 7 is a view showing a fourth embodiment according to the present invention.

Further, in the fourth embodiment shown in FIG. 7, sensing plates 19 are bonded to seating grooves 23 formed in a wheel body 21, which is covered by an outer cover 3.

That is, in the fourth embodiment, outer cover 3 and sensing plates 19 are first combined, with prominences 17 of sensing plates protruding outside through outer cover 3, outer cover 3 with sensing plates 19 is covered on the outer surface of wheel body 21, and then sensing plates 19 are bonded to seating grooves 23 formed in advance in wheel body 21.

This structure has the advantage of easily combining sensing plates 19 with wheel body 21.

The second and third embodiments, in comparison with the fourth embodiment, has a process of covering outer cover 3 after sensing plates 19 are first combined with wheel body 21.

Figure 8:
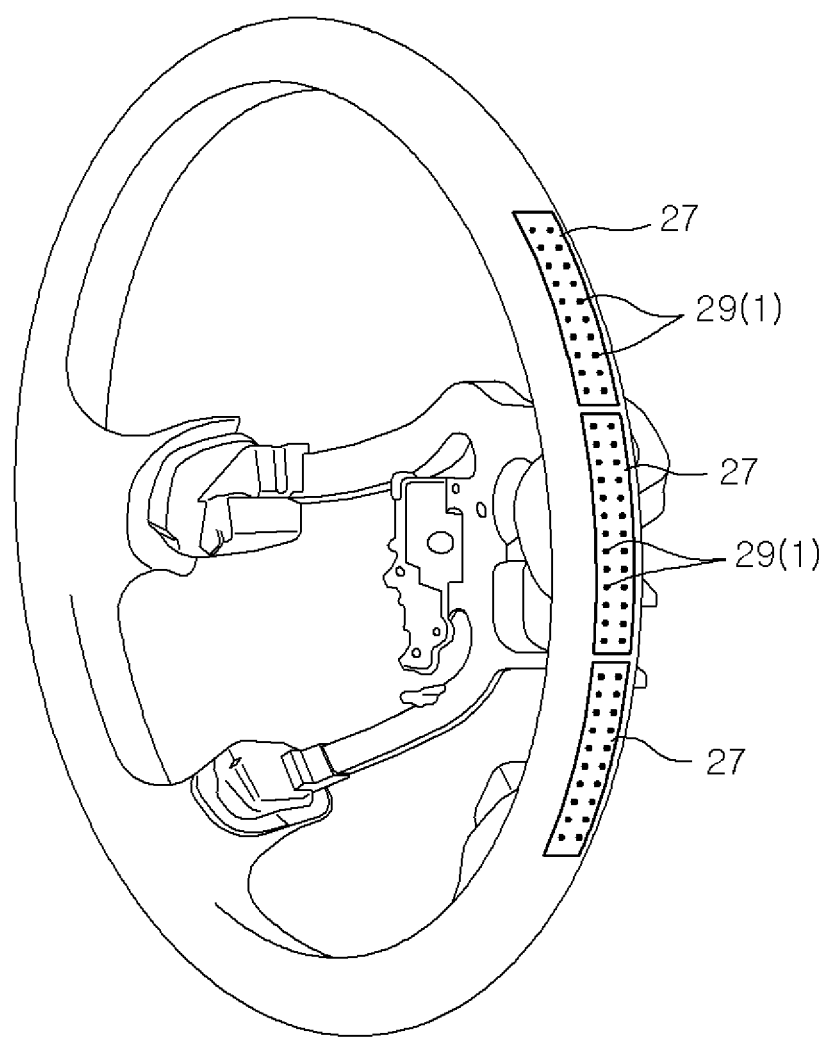
FIGS. 8 and 9 are views showing a fifth embodiment according to the present invention.
Figure 9:
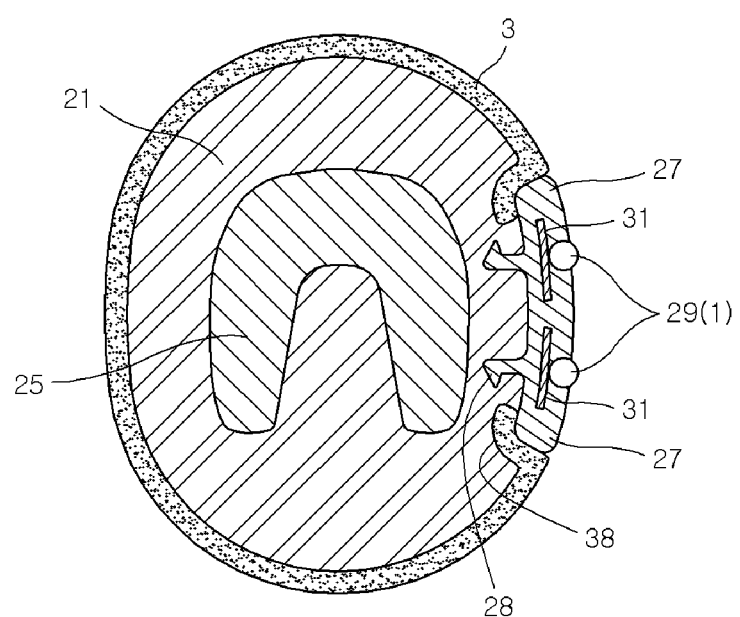

FIGS. 8 and 9 show a fifth embodiment, which includes a body assembly 27 that is combined with a wheel body 21 of a steering wheel to form a portion of the surface of the steering wheel, a plurality of metal prominences 29 that protrude from the surface of body assembly 27 to form sensing prominences 1, and a plurality of electric plates 31 that electrically connects at least two or more groups of metal prominences 29 in body assembly 27.

Body assembly 27 including a locking portion 28 is placed on a seating groove 38 and the locking portion 28 is snap-fitted in wheel body 21 to form the surface of the steering wheel without wrinkles, together with an outer cover 3 covering the outer surface of wheel body 21. The edge portion of the outer cover 3 may be disposed between the seating groove 38 and the body assembly 27.

Therefore, it is preferable that body assembly 27 is made of injection-molded plastic having a long arc shape along the steering wheel. Accordingly, it is integrally injection-molded with a plurality of metal prominences 29, in which it is preferable that it is injection-molded with electric plate 31 therein.

This structure has the advantage of allowing free design for the positions of metal prominences 29, improving aesthetic appearance of the steering wheel by variously changing the shape of body assembly 27, and improving grip-feeing of the steering wheel.

Figure 10:
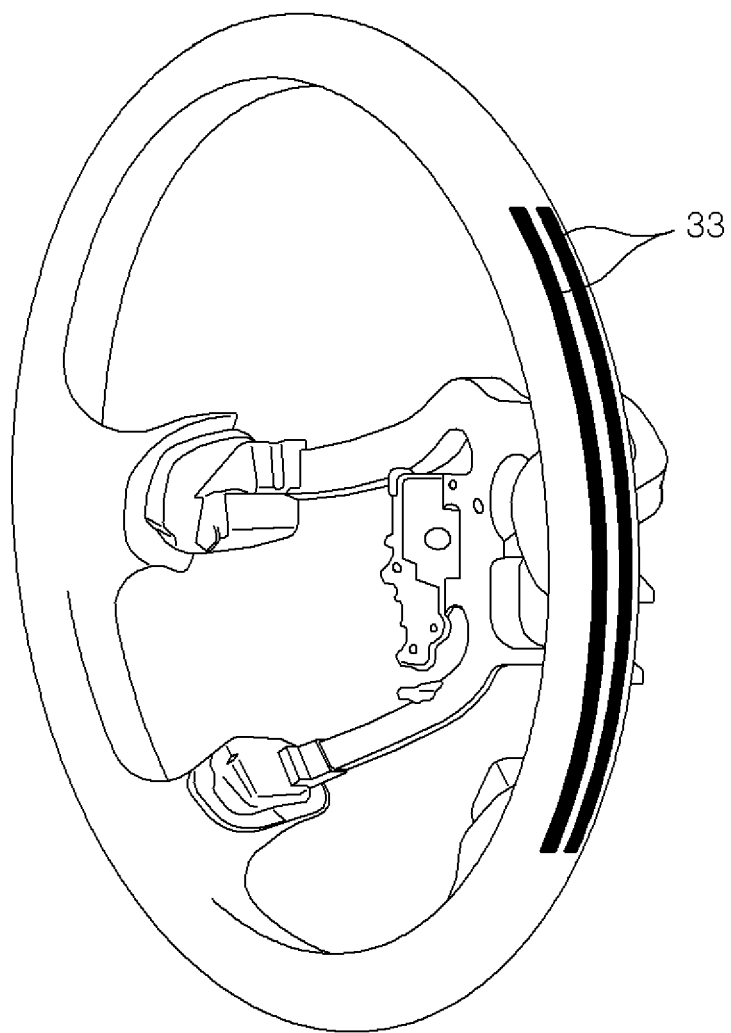
FIGS. 10 and 11 are views showing a sixth embodiment according to the present invention.
Figure 11:
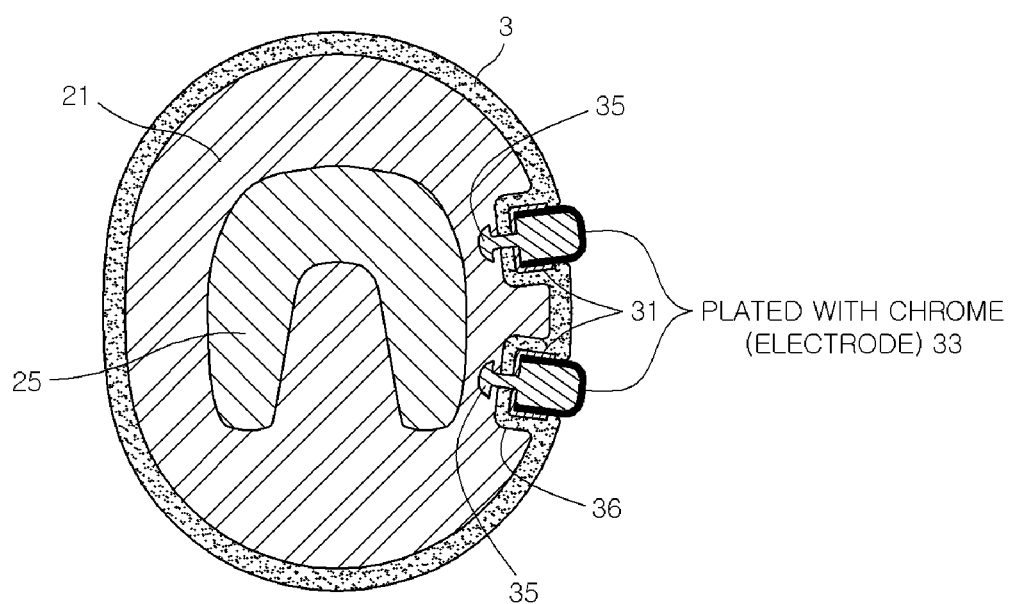

FIGS. 10 and 11 shows a sixth embodiment of the present invention, which includes sensing band bodies 33 protruding in a band shape from the surface of a steering wheel to form sensing prominences 1 and a wheel body 21 in which sensing band bodies 33 are embedded.

In this configuration, sensing band bodies 33 are made of injection-molded plastic and the surface of the steering wheel, which is exposed to the outside, is plated with electric conductive metal.

Chrome is plated in the present embodiment.

In this structure, sensing band 33 has a plurality of locking portions 35 that are snap-fitted in wheel body 21, locking portions 35 are snap-fitted in wheel body 21 through an outer cover 3 having a sheet shape covering the outer surface of wheel body 21, and an electric plate 31 is disposed between sensing band 33 and a seating groove 36 recessed inside wheel body 21 by sensing band 33 in outer cover 3.

Electric plate 31 is covered by sensing band 33 and outer cover 3 without being exposed to the outside.

This structure is achieved by plating a portion of sensing band bodies 33 made of injection-molded plastic, such that design is very free and excellent aesthetic appearance can be achieved.

For convenience in explanation and accurate definition in the appended claims, the terms "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A steering wheel with a biometric sensor apparatus, comprising:
    a plurality of sensing prominences having electric conductivity and protruding from an outer surface of the steering wheel;
    an outer cover formed in a sheet and covering an outer surface of a wheel body of the steering wheel;
    studs forming the sensing prominences, wherein a lower portion of each stud is inserted into the wheel body from the outside through the outer cover; and
    washers that are connected with the lower portion of each stud inserted in the outer cover:
    wherein each stud has a head positioned outside the outer cover and the lower portion thereof inserted through the outer cover and the outer cover is disposed between the head and the washer; and
    wherein a protruding end is formed toward the outer cover along a lower edge of the head.

2. The steering wheel with the biometric sensor apparatus as defined in claim 1, wherein an electric conductive plate electrically connected with the each stud is interposed between the washers and the outer cover.

* * * * *